United States Patent [19]

Dreiseitl et al.

[11] 4,335,343

[45] Jun. 15, 1982

[54] CIRCUIT FOR GENERATING AN ELECTRIC SIGNAL PROPORTIONAL TO A FLUX COMPONENT OF A ROTATING-FIELD MACHINE

[75] Inventors: Walter Dreiseitl; Dieter Köllensperger; Theodor Salzmann, all of Erlangen; Thomas Schlegel, Hemhofen; Wolf-Dieter Weigel, Kleinsendelbach, all of Fed. Rep. of Germany

[73] Assignee: Siemens Aktiengesellschaft, Munich, Fed. Rep. of Germany

[21] Appl. No.: 58,832

[22] Filed: Jul. 18, 1979

[30] Foreign Application Priority Data

Jul. 31, 1978 [DE] Fed. Rep. of Germany ....... 2833593

[51] Int. Cl.$^3$ .......................... H02P 5/28; H02P 5/34
[52] U.S. Cl. .................................. 318/798; 318/702; 318/803; 318/811
[58] Field of Search ...................... 318/262, 712–719, 318/803, 807, 798, 811

[56] References Cited

U.S. PATENT DOCUMENTS

| | | | |
|---|---|---|---|
| 3,593,683 | 7/1971 | Blaschke et al. | 318/803 |
| 3,902,109 | 8/1975 | Speth et al. | 318/341 |
| 4,119,893 | 10/1978 | Bayer et al. | 318/712 |

Primary Examiner—David Smith, Jr.
Attorney, Agent, or Firm—Kenyon & Kenyon

[57] ABSTRACT

For forming an electric voltage signal which is proportional to a flux component of a rotating-field machine, a voltage associated with the flux component is fed to the input of an integrator, and a voltage signal proportional to the flux component is taken off of the integrator. The input of a zero-controller for suppressing the DC component of this voltage signal is connected to the output of the integrator and the output of the zero-controller is connected to a summing point at the input of the integrator. This integrator circuit can be used to determine the position of the flux of a rotating field machine, with the correct phase and amplitude, and independently of frequency, while the zero-controller remains engaged at speeds from the beginning of localization of standing rotor position up to the nominal frequency of the machine. The zero-controller has a P-controller and an I-controller whose output signals are fed to the summing point. The output signal of the integrator, weighted in proportion to the frequency of the machine, is fed to the input of the P-controller and, weighted in proportion to the square of the frequency, is fed to the input of the I-controller, the weighting factor having a maximum value of one. The circuit constitutes an AC voltage integrator having a characteristic frequency which depends on the frequency of the rotating field machine, the intercept frequency and the attenuation remaining constant. The phase error remains constant over the entire speed range of the rotating field machine.

8 Claims, 5 Drawing Figures

CIRCUIT FOR GENERATING AN ELECTRIC SIGNAL PROPORTIONAL TO A FLUX COMPONENT OF A ROTATING-FIELD MACHINE

BACKGROUND OF THE INVENTION

1. Field of the Invention

This invention relates to a circuit for forming an electric signal which is proportional to a flux component of a rotating field machine. A voltage proportional to the Y-voltage belonging to the flux component is fed to an integrator. The voltage signal proportional to the flux component is taken off at the output, and a zero-controller is provided for suppressing the DC component. The input of the zero-controller is connected to the output of the integrator and the output of the zero-controller is connected to a summing point at the input of the integrator.

2. Description of the Prior Art

Such a circuit arrangement is known from German Auslegeschrift No. 26 35 965. The term "rotating-field machines" includes synchronous and asynchronous machines which can be operated as motors or generators.

The prior art circuit arrangement forms the actual flux value by integration of the terminal voltage of the rotating-field machine, and the current is utilized to take the ohmic stator voltage drops and reactive (inductive stray) voltage drops into consideration. Two such circuit arrangements for two phases of the rotating-field machine are required in a three-phase rotating-field machine. The two flux components so established determine the position of the flux vector and its magnitude. Information regarding the position and magnitude of the flux vector makes it possible to operate the rotating-field machine with field orientation (see Siemens-Zeitschrift 1971, pages 765 to 768 and German Pat. No. 23 53 594).

To avoid drifting of the integrator due to DC components, a PI zero-controller is employed in the prior art circuit. The choice of the parameters of the PI zero-controller controls determines the amplitude and phase error of the flux component determined. In this case, the phase error depends on the speed. When the PI zero-controller is designed so that the phase error remains sufficiently small at the lowest operating frequency of the rotating-field machine, very high gains occur when there are beats between the machine and the network frequency, so that instability can occur when drive control actions are performed.

It is particularly important to measure the flux components as accurately as possible when the rotating-field machine is being started, since a measuring error, in the worst case, can lead to the inability of the rotating-field machine to start. In the known circuit arrangement, the zero-control is disconnected for this purpose. In this connection, the determination of the instant when the zero-controller is switched on and when it is to be switched on while the machine is running is a problem, since transients can occur in this process and lead to instability.

It is an object of the invention to develop a circuit of the type mentioned above in which the flux component can be determined with its true amplitude, with a small and constant phase error, independently of the frequency of the rotating-field machine, and in which synchronized switching on of the zero-controller becomes unnecessary.

BRIEF DESCRIPTION OF THE INVENTION

According to the invention, this problem is solved by providing a zero-controller having a P-controller and an I-controller, with the output signals of both the P-controller and the I-controller being fed to a summing point at the input to the integrator. The output signal of the integrator is fed, weighted in proportion to the frequency of the rotating-field machine, to the input of the P-controller, and, weighted proportional to the square of the frequency, to the input of the I-controller, the weighting factor having a maximum value of 1.

The circuit of this invention thus represents an AC voltage integrator as a kind of adaptive voltage model, of which the characteristic frequency $\omega_o$ can be varied as a function of the frequency of the rotating field machine, with the intercept frequency $\omega_D$ and attenuation d held constant. For localizing the position of the rotor flux of the rotating field machine at standstill (n=0) prior to starting, the characteristic frequency $\omega_o$ of the circuit arrangement is set equal to zero by setting the weighting factor on the input side of the P-controller and the I-controller to zero. Then, except for drift errors and errors due to the determination of the phase voltage during excitation, no further errors occur. Synchronized release of the zero-controller during the start of the machine is unnecessary, since the characteristic frequency $\omega_o$ can be varied from 0 to $\omega_{o\,max}$ by continuous variation of the weighting factor. If the characteristic frequency $\omega_o$ of the AC voltage integrator is controlled in proportion to the speed, then the phase error of the AC voltage integrator is constant. Beat frequencies occurring in drive control regulation can be attenuated more effectively with the circuit of the invention.

Instead of the Y-voltage, a phase voltage of the rotating field machine can also be fed to the input of the circuit of the invention, since, in many cases, the neutral point is not accessible.

The circuit arrangement of the invention can be used for determining a flux component of the rotating field machine without further measures when the machine is drawing no current, since, in that case, no ohmic stator voltage drops or reactive (inductive stray) voltages occur. In a three-phase machine under load, these voltage drops are taken into consideration in a manner well known in the art, such as is seen, for instance, German Auslegeschrift No. 26 35 965, mentioned above.

The circuit arrangement of the invention can also be used, apart from its connection to a rotating-field machine, as an AC voltage integrator; in such a case an AC voltage containing DC components is fed to the input, instead of the Y-voltage of the rotating field machine, the input voltage of the P-controller is weighted in proportion to a variable, preferably to frequency, and the input voltage of the I-controller is weighted in proportion to the square of this variable. In this way, advantage can be taken of the variable characteristic frequency $\omega_o$ of an AC voltage integrator inherent in the invention, to provide a frequency-independent control speed for DC components which has constancy of the angle error.

In one preferred circuit arrangement, the P-controller is preceded by a first multiplier and the output signal of the first multiplier is fed to a second multiplier which precedes the input of the I-controller. The multiplication factors of the two multipliers are equal and proportional to the frequency of the rotating field machine. In this simple way, the input signal of the P-controller is made proportional to the frequency and the input signal of the I-controller is proportional to the square of the frequency of the rotating-field machine.

It is advantageous to use pulse-width multipliers as multipliers and to use a smoothing stage before the second pulse-width multiplier. The duty cycle of the pulse-width multipliers is made proportional to the frequency of the rotating field machine. The voltage after the pulse-width multiplier is always the product of the duty cycle and the input voltage of the pulse-width multiplier. In order to obtain quadratic influencing of the input voltage of the I-controller, it is necessary to insert a smoothing stage between the two pulse-width multipliers, which are connected in series with respect to the I-controller.

It is advantageous if a capacitor serves as the smoothing stage, which is shunted across the feedback resistor of an inverting amplifier following the first pulse-width multiplier, the output signal of the inverting amplifier being supplied to the inputs of the P-controller and to the input of the second pulse-width multiplier. Satisfactory smoothing is obtained thereby with simple means.

So as to affect the behavior in time of the null-controller as little as possible, the capacitance of the smoothing capacitor is advantageously kept very small in comparison with that of the capacitor determining the time constant of the I-controller. The lower limit of the capacitance of the capacitor is given by the required smoothing.

In another preferred embodiment, FET switches are used as the pulse width multipliers and the output signal of a clock generator is applied to their control inputs, the duty cycle of the clock generator being proportional to the frequency of the rotating-field machine. This is a cost effective realization of a pulse-width multiplier.

It is advantageous to vary the pulse frequency of the clock generator below a transition frequency of the rotating-field machine, and to vary its pulse width above the transition frequency. This makes possible a very large control range for the duty cycle.

To ensure consideration of the ohmic stator voltage drops and the reactive (inductive stray) voltages of the rotating-field machine at low cost, it is advantageous to feed a signal proportional to the ohmic stator voltage drop of the rotating field machine to the summing point at the input of the integrator and to feed a signal proportional to the integral of the inductive stray voltage to a second summing junction at the output of the integrator.

DETAILED DESCRIPTION OF THE INVENTION

Figure 1:
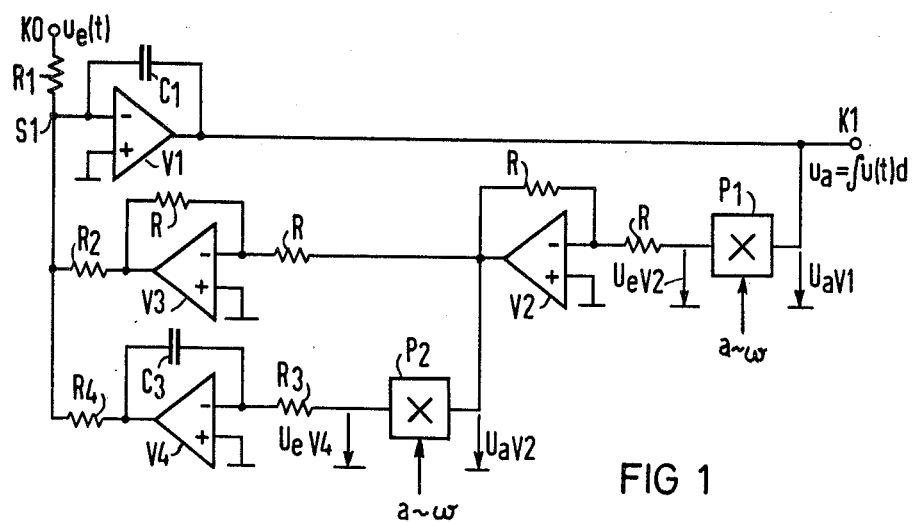
FIG. 1 is a schematic diagram of a circuit for forming a signal which is proportional to the flux in a rotating machine.

FIG. 1 shows a first embodiment example of a circuit for forming a signal proportional to the flux in a rotating machine according to the invention. To the input terminal K0 is applied the input voltage $u_e$, which corresponds, in the illustrative embodiment, to a flux component of the corresponding phase voltage. The input voltage $u_e$ is applied via the resistor R, to a summing point S1 at the input of integrator V1. P-controller V3, I-controller V4, inverting amplifier V2 and first and second multipliers P1 and P2, constitute the zero-controller, in a negative feedback loop. Inverting amplifier V2 serves to correct the signal polarity of the zero-controller for the negative feedback. The output signal $u_a$ of the AC voltage integrator circuit is available at terminal K1. The zero-controller is constructed, according to the invention, in such a manner that the output signal of integrator V1 is fed, via the feedback path, to multiplier P1, the output signal of which is fed to the input of inverting amplifier V2. In multiplier P1, the input voltage $U_{aV1}$ is multiplied by a factor a, which can be varied between the values 0 and 1, in proportion to the speed of rotation of the rotating field machine. The output voltage $U_{eV2}$ of first multiplier P1, thus obtained, is the product of the weighting factor a and the input voltage $u_{aV1}$. The output voltage $U_{aV2}$ of inverting amplifier V2 is fed to both the input of P-controller V3 and, via second multiplier P2, to the input of the I-controller V4. Second multiplier P2 also performs a multiplication of its input voltage $U_{aV2}$ by the weighting factor a which is proportional to the frequency $\omega$ of the rotating field machine M, so that the input signal $U_{eV4}$ of I-controller V4 represents the produce of the square of the weighting factor a and the input voltage $U_{aV1}$ of the zero-controller. The input signal of the P-controller is thus weighted with the speed proportional weighting factor a and the input signal of I-controller V4, with the square of the weighting factor a. The output signals of P-controller V3 and of I-controller V4 are fed to summing point S1 via resistors R2 and R4.

Figure 2:
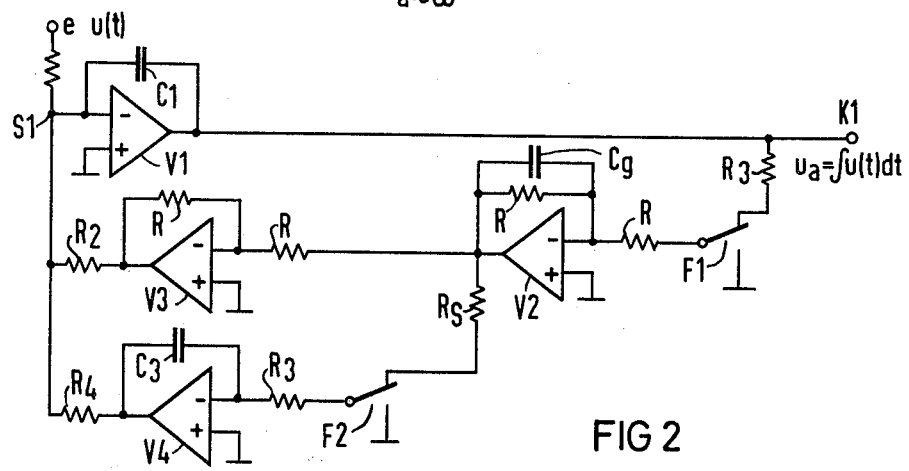
FIG. 2 is a schematic diagram of a circuit like that of FIG. 1, but using pulse-width multipliers.

In principle, analog multipliers can serve as the multipliers P1 and P2. In the present application, however, the errors of these as multipliers P1 and P2, lead to considerable null errors at the integrator output at low values of weighting factor a. For this reason, it is substantially more advantageous to use a modulation multiplication principle such as is illustrated in FIG. 2. Like components are provided with the same reference symbols in the figures.

In FIG. 2, pulse-width multipliers F1 and F2 are used instead of the analog multipliers P1 and P2. A possible low cost realization for such pulse-width multipliers is offered by FET switches, to the control input of which the output signal of a clock generator G is fed, the duty cycle of clock generator G corresponds to the weighting factor a and is therefore proportional to the frequency $\omega$ of the rotating field machine M. The pulse-width multipliers F1 and F2 are driven synchronously by the clock generator G.

When pulse-width multipliers F1 and F2 are used, however, it is necessary to feed the output voltage of the first pulse-width multiplier F1 to the second pulse-width multiplier F2 in smoothed condition, since without this measure, no square-law dependence of the input signal of the I-controller V4 on the weighting factor a would come about. This smoothing is accomplished by shunting the capacitor $C_g$ across the feedback resistor R of inverting amplifier V2. The capacity of this capacitor $C_g$ is very small as compared to that of capacitor $C_3$ which determines the time constant of I-controller V4, so as to leave the useful signal uninfluenced as far as possible and to attenuate only the superimposed switching frequency. The resistors $R_S$ in series with pulse-width multipliers F1 and F2 serve to protect the preceding integrator V1 and the preceding inverting amplifier V2 against reactions to the switching transients caused by pulse-width multipliers F1 and F2. The resistance of resistor $R_S$ is very small as compared to the resistance of resistors R and R3.

Figure 3:
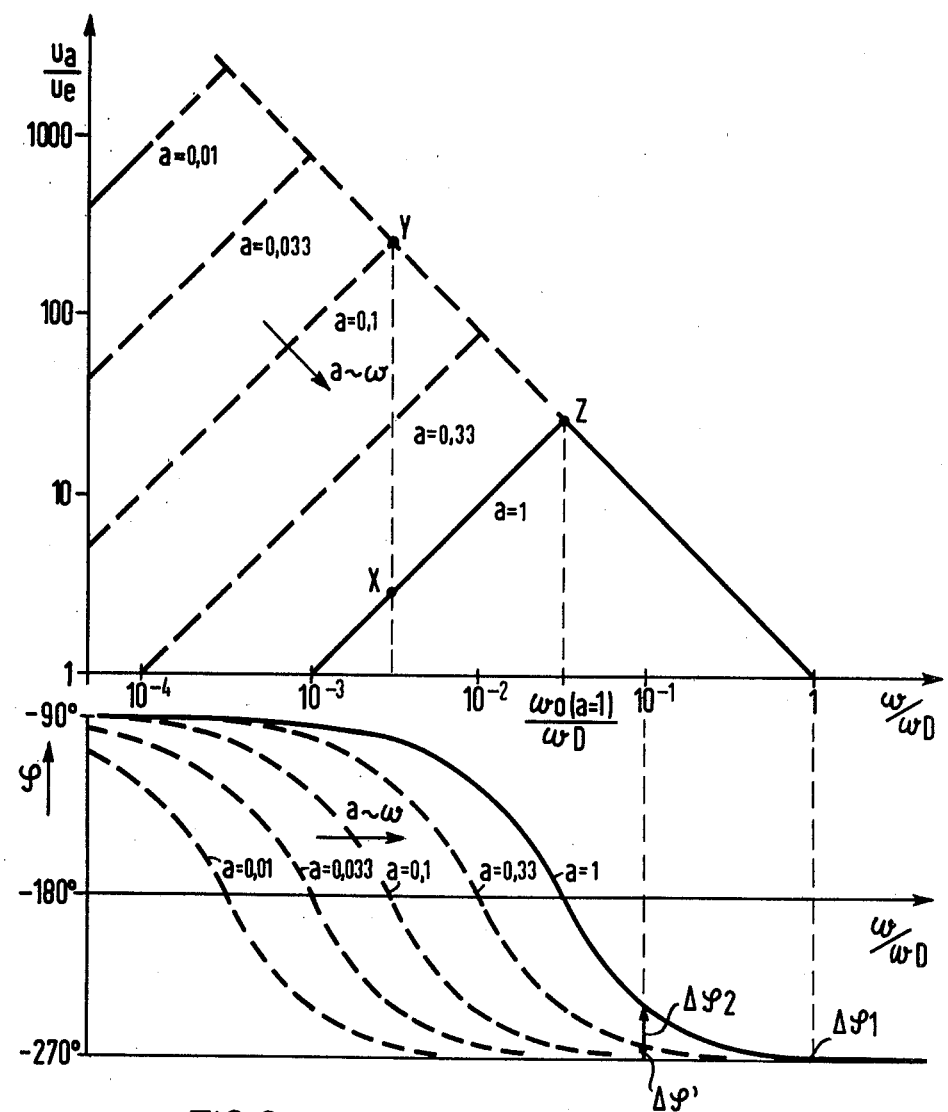
FIG. 3 is a chart showing the frequency response characteristic of a circuit according to the teachings of the invention.

In FIG. 3, the frequency response of the circuit arrangement according to the invention is shown. It is assumed here that an optimization for optimum amplitude was performed, which leads to an attenuation of d=0.7. Each of the frequency responses shown in FIG. 3 corresponds to that of a $DT_2$-stage.

In the upper part of FIG. 3, the amplitude ratio of the output voltage $u_a$ to the input voltage $u_e$, of the circuit of the invention, is shown as a function of the frequency $\omega$ of the rotating field machine M in a log-log plot. In this presentation the weighting factor a is a parameter; it is also called the duty cycle a in the following. For the plot of FIG. 3, the duty cycle a was varied in steps between between 0.01 and 1. The normalized frequency $\omega/\omega_D$ is used as the unit on the abscissa, where $\omega$ is the intercept frequency of the circuit, i.e., the intersection of the frequency response with the abscissa in FIG. 3.

In the lower part of FIG. 3, the phase difference $\phi$ (shift) between the output voltage $u_a$ and the input voltage $u_e$ is shown, likewise as a function of the normalized frequency $\omega/\omega_D$ of the rotating field machine M. Here, the weighting factor or duty cycle a was varied in steps between 0.01 and 1.

The circuit of the invention therefore constitutes an AC voltage integrator which has a frequency-dependent characteristic frequency $\omega_o$ for constant intercept frequency $\omega_D$ and constant attenuation d. The characteristic frequency $\omega_o$ is adjusted by varying the duty cycle a of the two pulse-width multipliers F1 and F2. If the characteristic frequency $\omega_o$ is controlled in proportional to the frequency $\omega$ and therefore, to the speed n of the rotating field machine M, then the phase error of the AC voltage integrator of the invention is independent of the speed.

The AC voltage integrator known from German Ausegeschrift No. 26 36 965, mentioned at the outset, on the other hand, has a fixed, i.e., frequency independent characteristic frequency $\omega_o$. Thus, its frequency response corresponds to one of the curves shown in FIG. 3. Let us assume, as an example, that the frequency response of prior art AC voltage integrator corresponds to the frequency response at the duty cycle a=1, which is shown as a solid line. Let us further assume that the nominal frequency of the rotating field machine drive corresponds to $\omega_D$. It can be seen from FIG. 3 that the phase error $\Delta\phi_1$, i.e., the deviation of the solid line from the asymptotic value $-270°$, of about 3°, is very small. If the rotating-field machine drive equipped with conventional AC voltage integrators is now operated at a frequency $\omega$ reduced by a factor 10 then the value $\Delta\phi_2$ appears as the phase error; it is on the order of 30°. To preclude so large a phase error, it has heretofore been necessary to design the AC voltage integrator to have, for instance, a frequency response like that shown in FIG. 3 with the duty cycle a=0.1. This would lead to a reduction of the phase error to the value $\Delta\phi_2$. This was done, however, at the expense of less attenuation in the event of beats between the frequency of the rotating field machine M and the network frequency. For a beat frequency of 0.003 $_D$ the relatively high value Y, shown in the upper part of FIG. 3, is obtained for the amplitude ratio, it being assumed that the operating frequency of the rotating field machine is $\omega=\omega_D$.

In AC voltage integrators made in accordance with the invention, the characteristics frequency $\omega_o$ varies continuously with the actual speed of revolution or frequency of the rotating-field machine M; i.e., at a frequency of the rotating-field machine M of $\omega=\omega_D$, the frequency response of the AC voltage integrator is that shown by the duty cycle a=1, and, at a frequency of the rotating field machine M of $\omega=0.1\omega_D$, the frequency response curve is that belonging to a=0.1. As is readily seen from FIG. 3, only very small and constant phase errors $\Delta\phi$ occur then, since with decreasing frequency $\omega$ of the rotating-field machine drive, the curves representing the phase of the AC voltage integrator are shifted to the left continuously and in proportion to frequency, so that the phase error located between the lower part of each curve and the asymptote going through $-270°$ remains small and constant. For the operating case given above as an example, $\omega=\omega_D$, the solid curve is to be used for the amplitude ratio. For a beat frequency of 0.003 $_D$, considerably better attenuation is obtained in this case, since the value X now applies for the amplitude ratio instead of the value Y.

Figure 4:
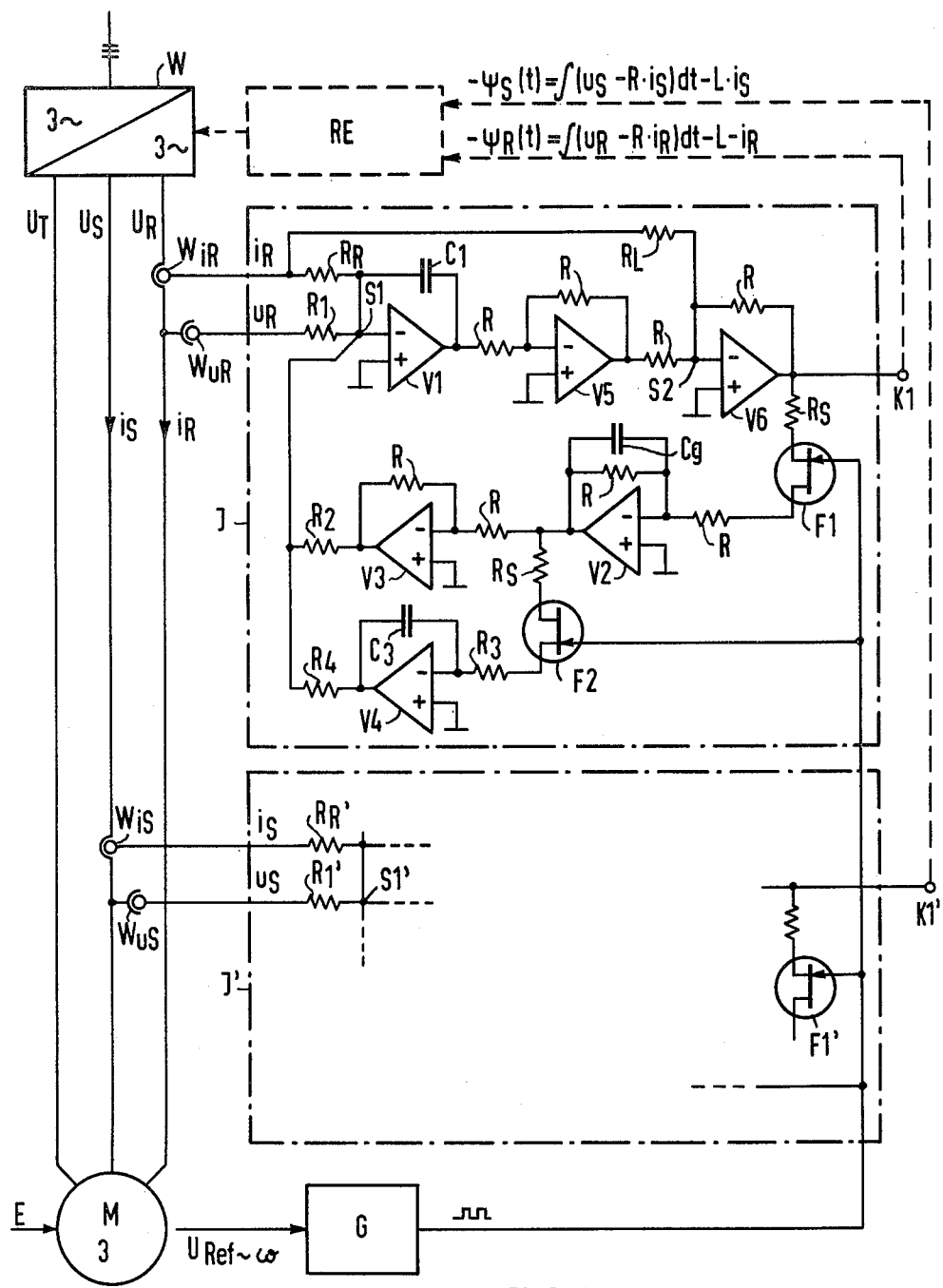
FIG. 4 is a schematic diagram showing the use of the circuit of the invention in connection with the drive for a synchronous rotating machine.

FIG. 4 shows the use of the circuit of the invention in conjunction with the drive of a rotating-field machine M, which as an example, is an internally-controlled synchronous machine having no rotor position transmitter. The machine M is supplied from a three-phase frequency converter W, the output voltages of which represent a variable frequency three phase system $U_T$, $U_S$ and $U_R$. To determine the position of the flux in the machine from the terminal voltages of the rotating-field machine M within the scope of the field oriented control of this rotating field machine, two of the circuits described above are required; they are designated I and I' in FIG. 4. Circuits I and I' are of identical design and corresponding elements in circuit I' in the drawing, etc., are merely provided with a prime, the reference symbols being otherwise the same. Circuit I is associated with the flux component of the rotating field machine M linked with the Y-voltage $U_R$, and the circuit I' with the flux component linked with the Y-voltage $U_S$. Knowing these two flux components makes it possible to fix the position of the flux vector of the rotating field machine, unequivocally, and to control the three-phase frequency converter W by a control unit RE in a manner known in the art.

The input voltage for circuit I is the voltage $U_R$ which is obtained via a voltage transformer $W_{uR}$ and is proportional to the Y-voltage $U_R$. To take the associated ohmic stator-voltage drops and the inductive stray voltages into consideration, the corresponding phase current is determined by means of current transformer $W_{iR}$. To compensate for the ohmic stator voltage drop, the output signal of the current transformer $W_{iR1}$ is fed via resistor $R_R$ to summing point S1 of the integrator. To compensate for the corresponding reactive (stray) voltage, the output signal of current transformer $W_{iR}$ is also fed, via resistor $R_L$, to summing point S2 of summing amplifier V6 which is connected, via inverting amplifier V5, to integrator V1. Thus, summing amplifier V6 amplifies the sum of the inverted signal from integrator V1 and the signal proportional to the integral of the reactive (inductive spray) voltage from current transformer $W_{iR}$.

By taking the reactive (inductive stray) voltage into consideration in this manner, it is not necessary, as in German Auslegeschrift No. 26 35 965 mentioned above, to take the derivative of the phase current $i_R$ with respect to time. Apart from circuit measures serving to compensate for the ohmic stator voltage drops and the reactive (inductive spray) voltages, the circuit I corresponds exactly to the one shown and explained in FIG. 2. As already mentioned, circuit I' associated with Y-voltage $U_S$ corresponds to the circuit I. On the input side, the output signals of voltage transformer $W_{uS}$ and of current transformer $W_{iS}$ associated with the three-phase system phase S are fed in here. Therefore, the value $$-\psi_R(t) = (u_R - R \times i_R) \, dt - L \times i_R$$

appears at terminal K1 of circuit I as the flux component and, at terminal K1', the value $$-\psi_S(t) = (u_S - R \times i_S) \, dt - L \times i_S.$$

The two flux components $\psi_R$ and $\psi_S$ are processed further in control unit RE.

For controlling pulse-width multipliers F1, F2 and F1', F2', designed as FET switches, the square wave output signal of a clock generator G, having a duty cycle a, is applied to the control inputs of these FET switches. To control the duty cycle a in proportion to the frequency, a reference voltage $U_{Ref}$ which is proportional to the frequency of rotating field machine M is fed to clock generator G. It can be obtained, for instance, from a tachometer generator coupled to the motor shaft.

Figure 5:
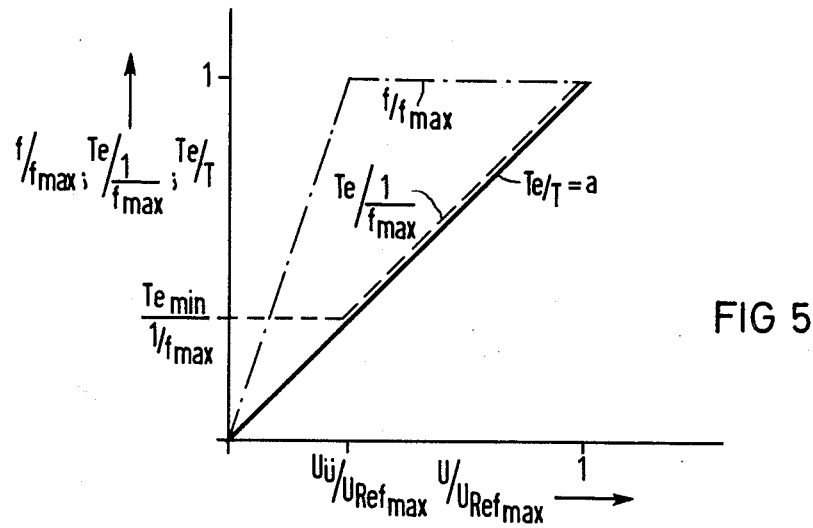
FIG. 5 is a diagram of the relationship between pulse-width, normalized, and the ratio of the output voltage to the reference voltage.

To make possible a control range of the duty cycle a which is as large as possible, a clock generator adjustable as to both pulse frequency and pulse width is used for clock generator G. This is schematically shown in FIG. 5. With a reference voltage $U_{Ref}$ which is proportional to the speed and which is lower than the transition voltage $U_u''$ the frequency is adjusted (curve $f/f_{max}$). The pulse width $T_{e\,min}$ remains constant. With a reference voltage $U_{Ref}$ which is above the transition voltage $U_u''$, the frequency remains constant and the pulse width is changed (curve $T_e/(1/f_{max})$. The transition from frequency to pulse-width adjustment is gradual as far as the duty cycle a is concerned. A square wave voltage having a duty cycle variable over wide limits (e.g., 1:1000) is obtained (curve $T_e/T$).

This very large control range makes it possible to set very small duty cycles or weighting factors a, having the effect of decoupling the zero-controller from the integrator almost completely. This is important for the locating the position of the rotor of the rotating field machine M at standstill before the rotating field machine is started, since then, in the case of a synchronous machine with the stator current switched off, only the induction voltage generated in the stator windings of the rotating-field machine M is integrated by the integrator when the rotor wheel is excited. A coupled zero-controller would in this case tend to bring the integrator content to zero and to thereby falsify an exact position location of the rotor. In the above mentioned German Auslegeschrift No. 26 35 965, this problem is solved by disconnecting the zero-controller, giving rise to the problem discussed above when the zero-controller is suddenly connected after the machine has been started. The circuit of the invention, in contrast thereto, makes it possible to leave the zero-controller in continuous engagement from the beginning of the position location, but with frequency-proportional effect; i.e., since the coupling increases with the duty cycle a, or the increase of the effect of the zero-controller, a coupling matched to the frequency of the rotating-field machine M and, thereby, a control rate increasing with the frequency of the machine, can be attained. With a duty cycle of unity and, thereby, a fully coupled zero-controller, the DC components of the output signal are levelled out with the highest control speed. Before localizing the position of the rotor, it is advantageous to first bring the duty cycle a approximately to unity in order to set the integrator initially at zero. For the subsequent position location, the duty cycle a is then brought, as just mentioned, to a value proportional to the speed or, if the rotor is standing still, to zero.

In summary, it can be stated that, by using AC voltage integrator circuit of the present invention, operation of a field orientation operated rotating-field machine can be obtained with few problems. By means of the frequency response adapted to the frequency of the rotating-field machine, continuous operation of the AC voltage integrator, from the start-up until the nominal operating frequency is reached, is made possible throughout. Such phase errors as occur remain constant over the entire range of operation. Since sudden connection of the zero-controller of the AC voltage integrator to the running machine after the rotating field machine has been started, is eliminated, any stability problems which would occur, in this connection, are removed.

The circuit of the invention can be used, in addition to determining the flux of a rotating field machine as described above, wherever an AC voltage integrator having a variable characteristic frequency is of advantage.

What is claimed is:

1. An AC voltage integrating circuit, useful for forming an electric voltage signal proportional to a flux component in a rotating field machine from a voltage which is proportional to a Y voltage corresponding to the flux component and which contains a DC component, comprising:

an integrator having an input to which the voltage proportional to the Y voltage is fed and an output at which the signal voltage proportional to the flux component in the machine is taken off;

a summing point at the input of the integrator;

a zero-controller for suppressing the DC component comprising a P-controller and an I-controller, each having an output fed to the summing point and each having an input;

first means having a first input coupled to the output of the integrator, a second input to which a signal having a value between zero and one which is proportional to the frequency of the machine is coupled, and providing an output signal coupled to the P-controller which is proportional to the frequency of the machine; and second means having a first input coupled to the output of the integrator and a second input to which the signal which is proportional to the frequency of the machine is coupled and providing a signal to the I-controller which is proportional to the square of the frequency of the machine.

2. A circuit according to claim 1 in which the first means comprises a first multiplier and the second means comprises a second multiplier having the output of the first multiplier coupled to its first input.

3. A circuit according to claim 2 in which the first and second multipliers comprise pulse-width multipliers and further comprising:
   a smoothing member connected to the intput of the second pulse-width multiplier.

4. A circuit according to claim 3, and further comprising:
   an inverting amplifier coupling the output of the first pulse-width multiplier to the input of the P-controller and to the input of the second multiplier, the inverting amplifier having a feedback resistor, and in which the smoothing member comprises a capacitor coupled across the feedback resistor.

5. A circuit according to claim 4 in which the I-controller includes a capacitor for determining the time constant and in which the capacitance of the smoothing capacitor is very small in comparison to that of the capacitor which determines the time constant of the I-controller.

6. A circuit according to any one of claims 3 to 5 in which each pulse-width multiplier comprises an FET switch having a control input and further comprising:
   a clock generator having a duty cycle proportional to the frequency of the rotating field machine, the clock generator having an output fed to the control input of each FET switch.

7. A circuit according to claim 6 in which the clock generator is adjustable, as to pulse frequency, below a transition frequency of the rotating field machine and, as to pulse width, above the transition frequency.

8. A circuit according to one of claims 2 to 7 and further comprising:
   means for feeding a signal proportional to the ohmic stator voltage drop of the rotating field machine to the summing point at the input of the integrator;
   a second summing point at the output of the integrator; and
   means for feeding a signal proportional to the integral of the reactive voltage to the second summing point.

* * * * *